US009824679B1

(12) United States Patent
Granados

(10) Patent No.: US 9,824,679 B1
(45) Date of Patent: Nov. 21, 2017

(54) AUDIO ENHANCING APPARATUS FOR ELECTRONIC MEDIA DEVICES

(71) Applicant: Juan Granados, N Hollywood, CA (US)

(72) Inventor: Juan Granados, N Hollywood, CA (US)

( * ) Notice: Subject to any disclaimer, the term of this patent is extended or adjusted under 35 U.S.C. 154(b) by 0 days.

(21) Appl. No.: 15/231,414

(22) Filed: Aug. 8, 2016

(51) Int. Cl.
*G10K 11/28* (2006.01)
*H04M 1/215* (2006.01)
*H04R 1/34* (2006.01)

(52) U.S. Cl.
CPC .................................... *G10K 11/28* (2013.01)

(58) Field of Classification Search
CPC .... G10K 11/28; H04M 1/035; H04M 1/2155; H04R 1/345
USPC .................................................. 181/175, 191
See application file for complete search history.

(56) References Cited

U.S. PATENT DOCUMENTS

| | | | | |
|---|---|---|---|---|
| 5,778,062 | A * | 7/1998 | Vanmoor | H04M 1/0202 379/433.01 |
| 7,197,140 | B2 * | 3/2007 | Asaro | H04M 1/19 379/433.03 |
| 8,086,285 | B2 | 12/2011 | McNamara et al. | |
| 8,170,259 | B2 * | 5/2012 | Liu | H04R 1/02 381/365 |
| 8,256,568 | B2 | 9/2012 | Lin | |
| 8,616,327 | B1 * | 12/2013 | Palacios | H04M 1/035 181/175 |
| 8,767,992 | B2 | 7/2014 | Lester, Jr. | |
| 8,944,209 | B1 * | 2/2015 | Fields | G10K 11/08 181/175 |
| D731,468 | S * | 6/2015 | Wilkerson | D14/217 |
| 9,241,055 | B1 * | 1/2016 | Barker | H04M 1/04 |
| 2002/0009195 | A1 * | 1/2002 | Schon | B60R 11/0241 379/454 |
| 2012/0241247 | A1 * | 9/2012 | Choe | H04R 1/345 181/191 |
| 2013/0045782 | A1 * | 2/2013 | Simmer | H04M 1/035 455/575.8 |
| 2013/0048413 | A1 * | 2/2013 | Patzer | H04M 1/04 181/199 |
| 2013/0070948 | A1 * | 3/2013 | Lee | H04M 1/04 381/334 |
| 2013/0259282 | A1 * | 10/2013 | Lin | H04R 1/021 381/334 |
| 2013/0322660 | A1 * | 12/2013 | Weiss | G10K 11/28 381/160 |
| 2013/0329927 | A1 * | 12/2013 | Samarakoon | H04R 1/025 381/333 |

(Continued)

*Primary Examiner* — Jeremy Luks
(74) *Attorney, Agent, or Firm* — Stevenson IP, LLC

(57) ABSTRACT

An audio enhancing apparatus for electronic media devices including a support base having a rectangular rear side, an open front side, an open top side, a bottom side perpendicularly disposed to the rear side, and a pair of sidewalls. Each of the pair of sidewalls has a right triangulated bottom portion and an elongated rectangular top portion extended upwards from the bottom portion. Each of a right bracket and a left bracket of a pair of brackets is attached to the top portion of each of a right sidewall and a left sidewall, respectively, of the pair of sidewalls. The pair of brackets is configured to removably secure a bottom section of a portable electronic device within the support base.

1 Claim, 4 Drawing Sheets

(56) References Cited

U.S. PATENT DOCUMENTS

| | | | | |
|---|---|---|---|---|
| 2015/0041245 | A1* | 2/2015 | Smith | G10K 11/28<br>181/202 |
| 2015/0098601 | A1* | 4/2015 | Absher | H04R 1/345<br>381/352 |
| 2015/0131836 | A1* | 5/2015 | Hoshikawa | H04M 1/035<br>381/345 |
| 2016/0180831 | A1* | 6/2016 | Boden | G10K 11/28<br>181/175 |
| 2016/0219134 | A1* | 7/2016 | Cameron | H04R 1/2807 |
| 2016/0277820 | A1* | 9/2016 | Newman | H04R 1/028 |

* cited by examiner

AUDIO ENHANCING APPARATUS FOR ELECTRONIC MEDIA DEVICES

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of sound enhancement devices are known in the prior art. However, what has been needed is an audio enhancing apparatus for electronic media devices including a support base having a rectangular rear side, an open front side, an open top side, a bottom side perpendicularly disposed to the rear side, and a pair of sidewalls. What has been further needed is for each of the pair of sidewalls to have a right triangulated bottom portion and an elongated rectangular top portion extended upwards from the bottom portion. Lastly, what has been needed is for each of a right bracket and a left bracket of a pair of brackets to be attached to the top portion of each of a right sidewall and a left sidewall, respectively, of the pair of sidewalls. The pair of brackets is configured to removably secure a bottom section of a portable electronic device within the support base. The audio enhancing apparatus for electronic media devices is thus structured to direct sound from a speaker of a portable electronic device to a user in order to better capture and amplify the intensity of the sound.

FIELD OF THE INVENTION

The present invention relates to sound enhancement devices, and more particularly, to an audio enhancing apparatus for electronic media devices.

SUMMARY OF THE INVENTION

The general purpose of the present audio enhancing apparatus for electronic media devices, described subsequently in greater detail, is to provide an audio enhancing apparatus for electronic media devices which has many novel features that result in an audio enhancing apparatus for electronic media devices which is not anticipated, rendered obvious, suggested, or even implied by prior art, either alone or in combination thereof.

To accomplish this, the present audio enhancing apparatus for electronic media devices includes a support base having a rectangular rear side, an open front side, an open top side, a bottom side perpendicularly disposed to the rear side, and a pair of sidewalls including a right sidewall and a left sidewall. Each of the right sidewall and the left sidewall has a right triangulated bottom portion and an elongated rectangular top portion continuously extended upwards from the bottom portion. The top portion has a top edge and the bottom portion has a bottom edge. A height of the bottom portion of each of the pair of sidewalls of the support base is approximately equal to a height of the top portion of each of the pair of sidewalls of the support base. Each of the bottom portion and the top portion of each of the pair of sidewalls of the support base is perpendicularly disposed to each of the bottom side and the rear side of the support base.

The audio enhancing apparatus for electronic media devices further includes a pair of inwardly disposed solid rectangular brackets including a right bracket and a left bracket. Each of the right bracket and the left bracket is attached to the top portion of each of the right sidewall and the left sidewall, respectively, of the support base adjacent to the top edge. Additionally, each of the right bracket and the left bracket has a length less than a length of the top portion. The pair of brackets is configured to removably secure a bottom section of a portable electronic device within the support base. The portable electronic device can include, but not be limited to, a cellular phone, a laptop, and a tablet. The pair of sidewalls of the support base thus helps to direct and increase the intensity of the sound produced by a speaker on a portable electronic device in the direction of a user.

Thus has been broadly outlined the more important features of the present audio enhancing apparatus for electronic media devices so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
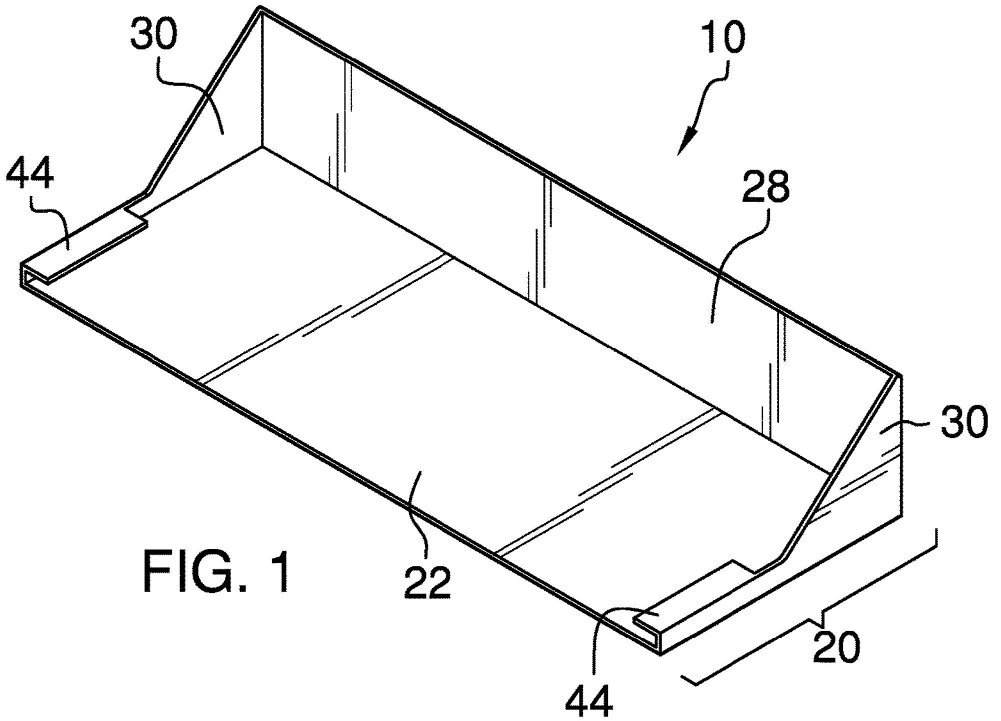
FIG. 1 is a rear isometric view.
Figure 2:
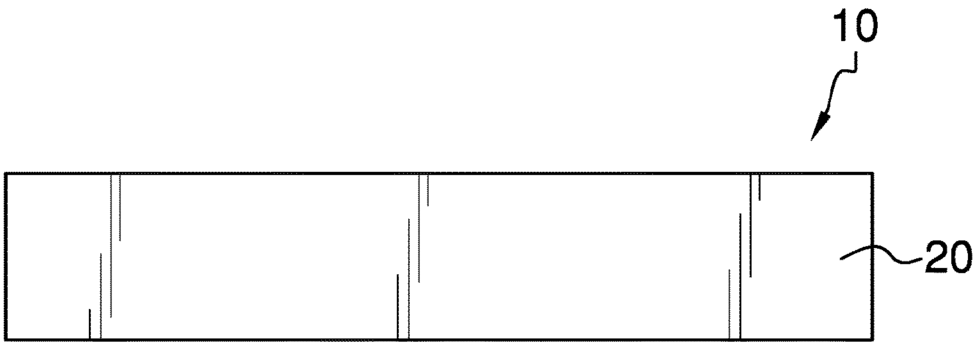
FIG. 2 is a bottom plan view.
Figure 3:
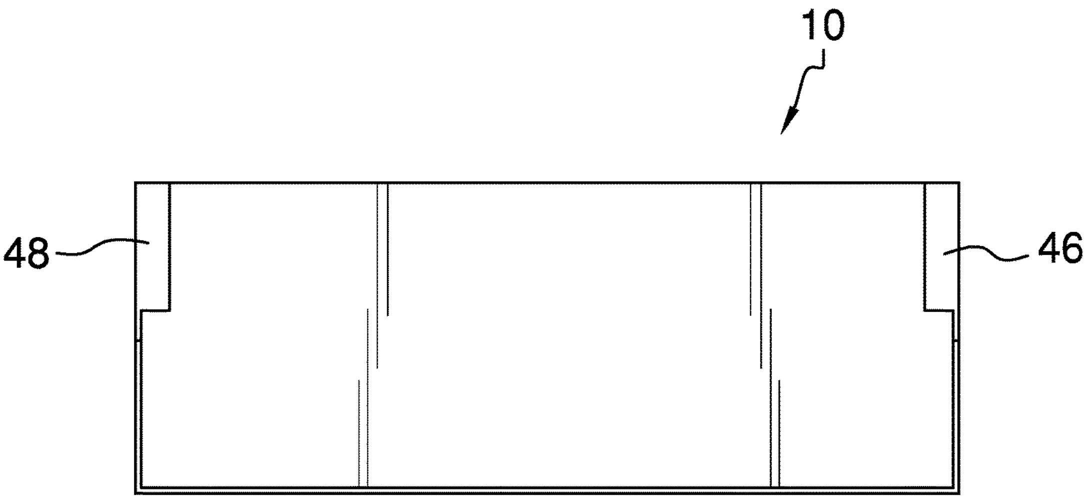
FIG. 3 is a front elevation view.
Figure 4:
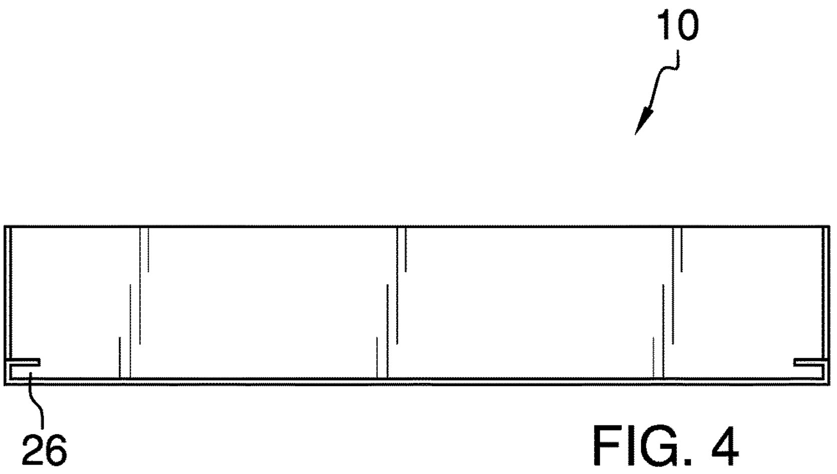
FIG. 4 is a top plan view.
Figure 5:
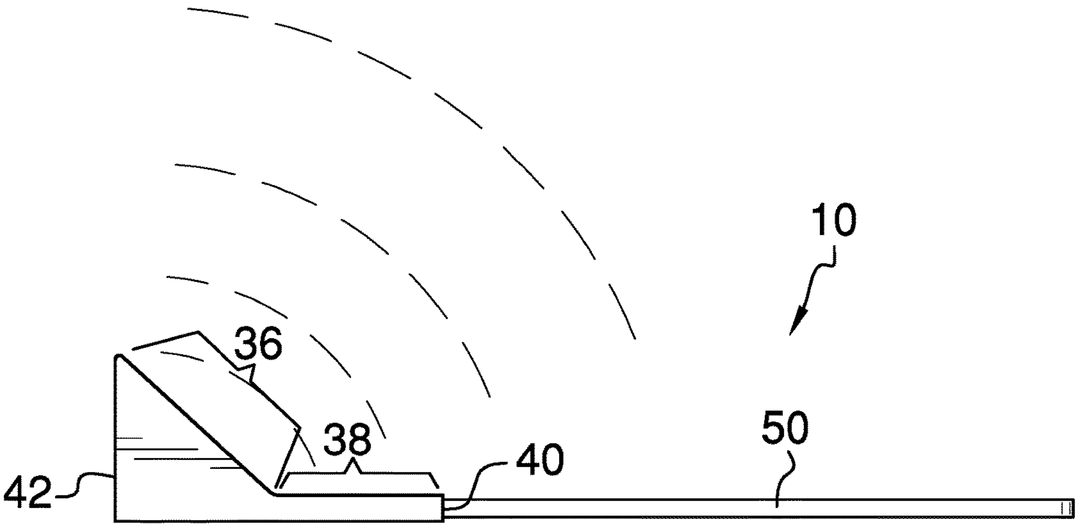
FIG. 5 is a side elevation view.
Figure 6:
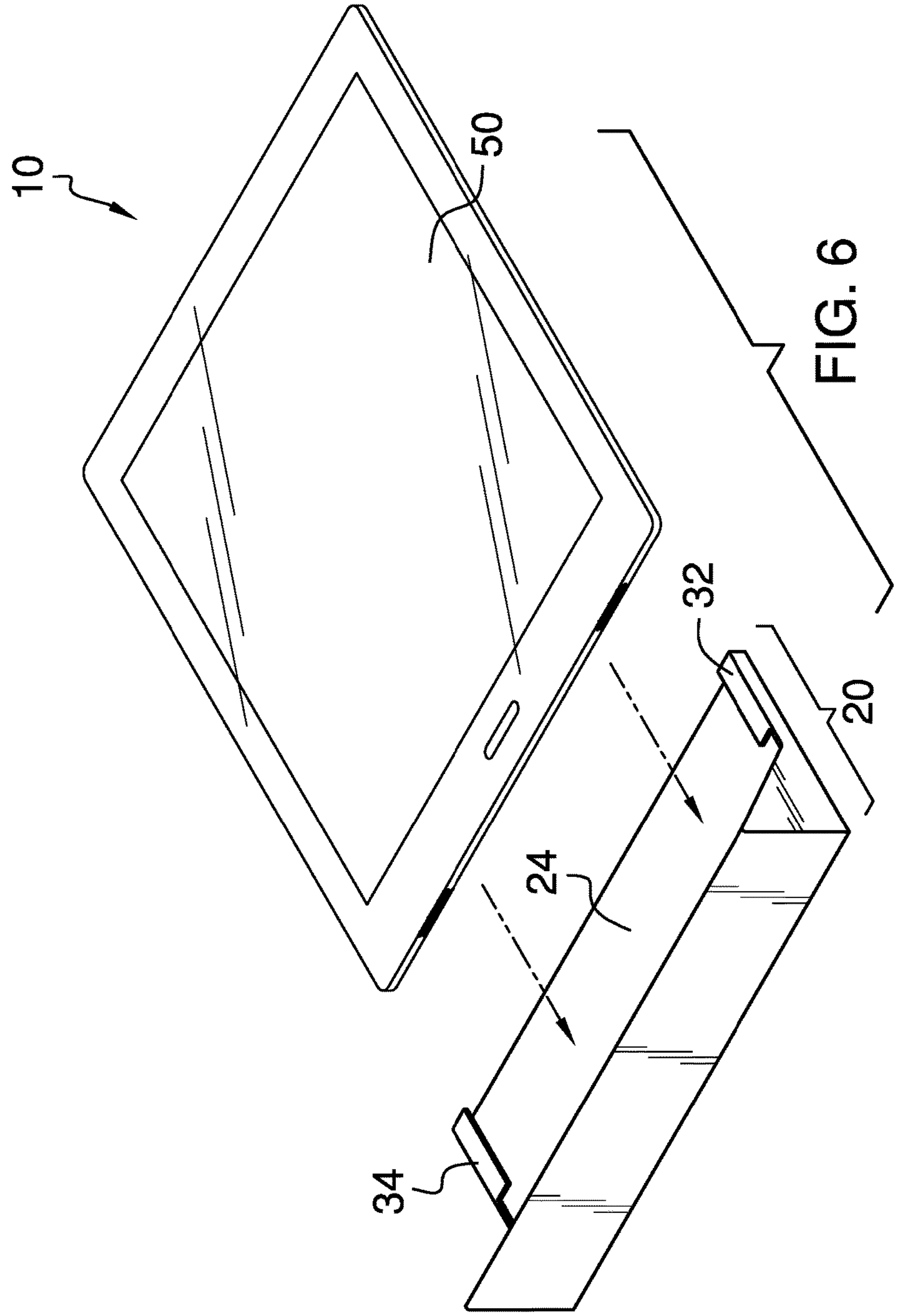
FIG. 6 is an in use view.

With reference now to the drawings, and in particular FIGS. 1 through 6 thereof, an example of the instant audio enhancing apparatus for electronic media devices employing the principles and concepts of the present audio enhancing apparatus for electronic media devices and generally designated by the reference number 10 will be described.

Referring to FIGS. 1 through 6 the present audio enhancing apparatus for electronic media devices 10 is illustrated. The audio enhancing apparatus for electronic media devices 10 includes a support base 20 having a rectangular rear side 22, an open front side 24, an open top side 26, a continuous rectangular bottom side 28 perpendicularly disposed and permanently affixed to the rear side 22, and a pair of sidewalls 30 including a right sidewall 32 and a left sidewall 34. Each of the right sidewall 32 and the left sidewall 34 has a right triangulated bottom portion 36 and an elongated rectangular top portion 38 continuously extended upwards from the bottom portion 36. The top portion 38 has a top edge 40 and the bottom portion 36 has a bottom edge 42. A height of the bottom portion 36 of each of the pair of sidewalls 30 of the support base 20 is approximately equal to a height of the top portion 38 of each of the pair of sidewalls 30 of the support base 20. Each of the bottom portion 36 and the top portion 38 of each of the pair of sidewalls 30 of the support base 20 is perpendicularly disposed and permanently affixed to each of the bottom side 28 and the rear side 22 of the support base 20.

The audio enhancing apparatus for electronic media devices 10 further includes a pair of inwardly disposed solid rectangular brackets 44 including a right bracket 46 and a left bracket 48. Each of the right bracket 46 and the left bracket 48 is attached to the top portion 38 of each of the right sidewall 32 and the left sidewall 34, respectively, of the support base 20 adjacent to the top edge 40. Additionally, each of the right bracket 46 and the left bracket 48 has a length less than a length of the top portion 38. The pair of brackets 44 is configured to removably secure a bottom section of a portable electronic device 50 within the support base 20.

What is claimed is:

1. An audio enhancing apparatus for electronic media devices comprising:

a support base having a rectangular rear side, an open front side, an open top side, a continuous rectangular bottom side perpendicularly disposed and permanently affixed to the rear side, and a pair of sidewalls comprising a right sidewall and a left sidewall, each of the right sidewall and the left sidewall having a right triangulated bottom portion and an elongated rectangular top portion continuously extended upwards from the bottom portion, wherein the top portion has a top edge and the bottom portion has a bottom edge;

wherein a height of the bottom portion of each of the pair of sidewalls of the support base is approximately equal to a height of the top portion of each of the pair of sidewalls of the support base;

wherein each of the bottom portion and the top portion of each of the pair of sidewalls of the support base is perpendicularly disposed and permanently affixed to each of the bottom side and the rear side of the support base; and a pair of inwardly disposed solid rectangular brackets comprising a right bracket and a left bracket, each of the right bracket and the left bracket attached to the top portion of each of the right sidewall and the left sidewall, respectively, of the support base adjacent to the top edge, wherein each of the right bracket and the left bracket has a length less than a length of the top portion;

wherein the pair of brackets is configured to removably secure a bottom section of a portable electronic device within the support base.

* * * * *